US012707113B2

(12) United States Patent
Sun et al.

(10) Patent No.: US 12,707,113 B2
(45) Date of Patent: Aug. 11, 2026

(54) PICTURE-IN-PICTURE DISPLAY METHOD AND APPARATUS, AND ELECTRONIC DEVICE AND READABLE STORAGE MEDIUM

(71) Applicant: RAYTRON TECHNOLOGY CO., LTD., Yantai (CN)

(72) Inventors: Tongbo Sun, Anhui (CN); Xingming Huang, Anhui (CN)

(73) Assignee: RAYTRON TECHNOLOGY CO., LTD., Yantai (CN)

( * ) Notice: Subject to any disclaimer, the term of this patent is extended or adjusted under 35 U.S.C. 154(b) by 124 days.

(21) Appl. No.: 18/703,330

(22) PCT Filed: Nov. 4, 2021

(86) PCT No.: PCT/CN2021/128634
§ 371 (c)(1),
(2) Date: Apr. 20, 2024

(87) PCT Pub. No.: WO2023/077351
PCT Pub. Date: May 11, 2023

(65) Prior Publication Data

US 2024/0412435 A1 Dec. 12, 2024

(51) Int. Cl.
*G06T 11/60* (2026.01)
*G06T 3/40* (2006.01)

(52) U.S. Cl.
CPC ................ *G06T 11/60* (2013.01); *G06T 3/40* (2013.01); *G06T 2207/20132* (2013.01)

(58) Field of Classification Search
CPC . G06T 11/60; G06T 2207/20132; G06T 3/40; H04N 21/4316; H04N 21/431; H04N 5/45
See application file for complete search history.

(56) References Cited

U.S. PATENT DOCUMENTS 7,911,687 B2 * 3/2011 Scholz .................. H04N 23/20 359/399
8,336,777 B1 * 12/2012 Pantuso .................... F41G 3/16 235/404
(Continued)

FOREIGN PATENT DOCUMENTS

CN 103491447 A 1/2014
CN 105142513 A 12/2015
(Continued)

OTHER PUBLICATIONS

International Search Report for PCT/CN2021/128634 mailed Jul. 22, 2022, ISA/CN.
European Search Report issued on Aug. 4, 2025 for EP21962868.2.

*Primary Examiner* — Phi Hoang
(74) *Attorney, Agent, or Firm* — Apex Attorneys at Law, LLP; Yue (Robert) Xu

(57) ABSTRACT

A picture-in-picture display method and apparatus, and an electronic device and a computer-readable storage medium. The method comprises: acquiring original image data; respectively processing the original image data by using at least two image processing algorithms, so as to obtain at least two corresponding images to be output; determining a target image from the at least two images to be output; generating a corresponding picture-in-picture image by using a non-target image from among the images to be output; and superimposing the picture-in-picture image onto the target image, so as to obtain an output image. An output image is obtained by means of superimposing a picture-in-picture image onto a target image, such that a user can acquire more information from the output image than that acquired by only viewing the target image, thereby enriching types of information acquired by the user, and facilitating the identification of a target. In addition, in the present application, a picture-in-picture image is generated by only using
(Continued)

one path of original image data in combination with a plurality of image processing algorithms, without the need of using a multi-functional hardware device to acquire a plurality of original signals.

9 Claims, 4 Drawing Sheets

(56) References Cited

U.S. PATENT DOCUMENTS

| | | | | |
|---|---|---|---|---|
| 2007/0172229 | A1* | 7/2007 | Wernersson | H04N 23/54 348/E5.025 |
| 2015/0199121 | A1 | 7/2015 | Gulaka et al. | |
| 2015/0235400 | A1* | 8/2015 | Magi | G06T 5/90 348/148 |
| 2019/0288744 | A1 | 9/2019 | Horsley et al. | |
| 2020/0396370 | A1* | 12/2020 | Zhen | G06T 5/92 |
| 2025/0037334 | A1* | 1/2025 | Alsheuski | G06F 3/04845 |

FOREIGN PATENT DOCUMENTS

| | | | |
|---|---|---|---|
| CN | 109417587 | A | 3/2019 |
| CN | 210007799 | U | 1/2020 |
| CN | 112037135 | A | 12/2020 |
| CN | 113379649 | A | 9/2021 |
| JP | 2006013618 | A | 1/2006 |
| JP | 2007325062 | A | 12/2007 |
| JP | 2010026021 | A | 2/2010 |

* cited by examiner

PICTURE-IN-PICTURE DISPLAY METHOD AND APPARATUS, AND ELECTRONIC DEVICE AND READABLE STORAGE MEDIUM

The present application is the US national phase of International application No. PCT/CN2021/128634, filed on Nov. 4, 2021, titled "PICTURE-IN-PICTURE DISPLAY METHOD AND APPARATUS, AND ELECTRONIC DEVICE AND READABLE STORAGE MEDIUM", which is incorporated herein by reference in its entirety.

FIELD

The present disclosure relates to the technical field of imaging, and in particular to a method and apparatus for picture-in-picture display, an electronic device and computer-readable storage medium.

BACKGROUND

In order to facilitate aiming, most of the current electronic sights have a picture-in-picture function. The conventional implementation method of the picture-in-picture function of the electronic sight is as follows: the area near the reticle in the center of the electronic sight is taken as a picture-in-picture image, which is enlarged and displayed separately. The picture-in-picture image and the original image are from a same source, but the picture-in-picture image is enlarged and displayed so that the user can better aim at the target. However, the user obtains less information from the image when using the electronic sight, and it is difficult to identify the target, that is, it does not help to quickly identify the target.

Therefore, the problem existing in related technologies that it is difficult to identify targets is a technical problem to be solved by those skilled in the art.

SUMMARY

In view of this, the object of the present disclosure is to provide a method and apparatus for picture-in-picture display, an electronic device and computer-readable storage medium, which enrich the types of information obtained by users and facilitate target identification.

In order to solve the above technical problem, according to the present disclosure, there is provided a method for picture-in-picture display including:

obtaining original image data;

processing the original image data by using at least two image processing algorithms, respectively, to obtain at least two types of to-be-outputted images correspondingly;

determining a target image from the at least two types of to-be-outputted images;

generating a picture-in-picture image by using a non-target image of the at least two types of to-be-outputted images; and superimposing the picture-in-picture image on the target image to obtain an output image.

Optionally, the generating of a picture-in-picture image by using a non-target image of the at least two types of to-be-outputted images includes:

cropping and/or scaling the non-target image to obtain the picture-in-picture image.

Optionally, the superimposing of the picture-in-picture image on the target image to obtain an output image includes:

determining a superimposition coordinate of the picture-in-picture image; and superimposing the picture-in-picture image on the target image based on the superimposition coordinate to obtain the output image.

Optionally, the determining of a superimposition coordinate of the picture-in-picture image includes:

determining a coordinate of the picture-in-picture image in the non-target image as the superimposition coordinate.

Optionally, after superimposing the picture-in-picture image on the target image to obtain an output image, the method further includes:

displaying the output image visually.

Optionally, before processing the original image data by using at least two image processing algorithms, respectively, the method further includes:

obtaining a selection instruction; and selecting the image processing algorithms from a plurality of candidate algorithms according to the selection instruction.

Optionally, after determining a target image from the at least two types of to-be-outputted images, the method further includes:

obtaining a switching instruction; and determining a new target image processing algorithm from the image processing algorithms according to the switching instruction, where the target image processing algorithm is used to generate the target image.

According to the present disclosure, there is further provided an apparatus for picture-in-picture display including:

an obtaining module configured to obtain original image data;

a processing module configured to process the original image data by using at least two image processing algorithms, respectively, to obtain at least two types of to-be-outputted images correspondingly;

a target determination module configured to determine a target image from the at least two types of to-be-outputted images;

a picture-in-picture generation module configured to generate a picture-in-picture image by using a non-target image of the at least two types of to-be-outputted images; and a superimposition module configured to superimpose the picture-in-picture image on the target image to obtain an output image.

According to the present disclosure, there is further provided an electronic device including a memory and a processor, where the memory is configured to store a computer program; and the processor is configured to execute the computer program to implement the above-mentioned method for picture-in-picture display.

According to the present disclosure, there is further provided a computer-readable storage medium for storing a computer program, where the computer program implements the above-mentioned method for picture-in-picture display while executed by a processor.

According to the present disclosure, the method for picture-in-picture display includes: obtaining original image data; processing the original image data by using at least two image processing algorithms, respectively, to obtain at least two types of to-be-outputted images correspondingly; determining a target image from the at least two types of to-be-outputted images; generating a picture-in-picture image by using a non-target image of the at least two types of to-be-outputted images; and superimposing the picture-in-picture image on the target image to obtain an output image.

It can be seen that this method is based on the original data stream, that is, after the original image data is obtained, it is processed by at least two different image processing algorithms, each image processing algorithm outputs a type of a to-be-outputted image, and at least two types of to-be-outputted images exist. One of the to-be-outputted images is selected as a basic image, that is, the target image, and other non-target images are used to generate corresponding picture-in-picture images. Since different image processing algorithms are used to process the same original image data, the obtained target image and picture-in-picture image can characterize the original image data from different aspects. The output image is obtained by superimposing the picture-in-picture image on the target image. The user can obtain more information with the output image than only viewing the target image, which enriches the type of information obtained by the user, and facilitates the identification of the target. In addition, in the present disclosure, only one channel of original image data is used together with a plurality of image processing algorithms to generate the picture-in-picture image, so that it is unnecessary to adopt multiple hardware devices to acquire multiple channels of original signals.

In addition, according to the present disclosure, there are further provided an apparatus for picture-in-picture display, an electronic device, and a computer-readable storage medium, which also have the above beneficial effects.

BRIEF DESCRIPTION OF THE DRAWINGS

In order to more clearly illustrate the technical solutions in the embodiments of the present application or related technologies, drawings needed in the description of the embodiments or related technologies are briefly introduced in the following. Apparently, the drawings in the following description are only embodiments of the present disclosure, and other drawings can also be obtained according to the provided drawings by those skilled in the art without any creative work.

DETAILED DESCRIPTION

In order to more clearly illustrate the objects, technical solutions and advantages in the embodiments of the present disclosure, the technical solutions in the embodiments of the present disclosure are described clearly in conjunction with the drawings in the embodiments of the present disclosure hereinafter. Apparently, the embodiments in the following description only show part of embodiments of the present disclosure rather than all the embodiments. Based on the embodiments of the present disclosure, all other embodiments obtained by those skilled in the art without any creative work fall into the protection scope of the present disclosure.

Figure 1:
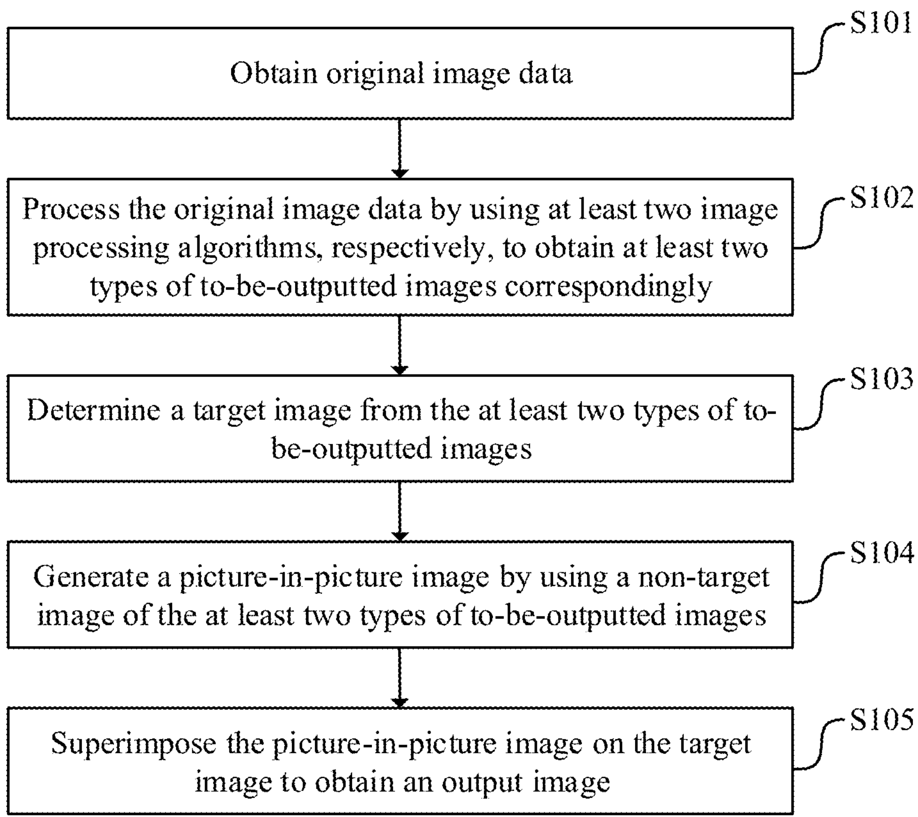
FIG. 1 is a flowchart showing a method for picture-in-picture display according to an embodiment of the present disclosure.

Reference is made to FIG. 1, which is a flowchart showing a method for picture-in-picture display according to an embodiment of the present disclosure. The method includes the following steps.

At S101, obtain original image data.

The original image data refers to image data directly obtained by an image obtaining component or device, which may be in the form of an image, or other types of data that can be used to generate images. Exemplarily, the original image data may be visible light image data, or may be infrared image data.

At S102, process the original image data by using at least two image processing algorithms, respectively, to obtain at least two types of to-be-outputted images correspondingly.

An image processing algorithm refers to an algorithm for generating an image. Generally, the original image data is processed by an image processing algorithm to obtain an image corresponding to the algorithm type. The same type of original image data usually can be processed by a variety of different image processing algorithms, and correspondingly, the images obtained after processed by different algorithms are also different. It is understandable that each image processing algorithm has its own advantages and disadvantages, and any image processing algorithm cannot obtain satisfactory image effects in all aspects. For example, some algorithms result in uniform gray scale distribution and clear background, but the target object is not prominent; some algorithms result in a prominent target, but the background gray scale compression is severe, and details are lost; some algorithms result in better contrast but fewer details; and some algorithms result in outstanding details, but the contrast is poor.

No matter which image processing algorithm is used alone to process the original image data, the information in the obtained image is less, which makes it difficult to quickly identify targets. In order to solve the above problem, at least two image processing algorithms are adopted in the present disclosure to process the original image data separately to obtain at least two to-be-outputted images correspondingly. It can be understood that the information and emphasis of different images are different, which makes it possible to retain more information after combining them, which is beneficial to target identification.

The type of the image processing algorithms is not limited in this embodiment, and the image processing algorithms may be selected or set according to various factors (such as time, geographic location, and personal preference). In order to improve the flexibility of the output image, a plurality of candidate algorithms may be preset, and an image processing algorithm is selected from them before generating the to-be-outputted image. Specifically, the following steps may be included.

At step 11, obtain a selection instruction.

At step 12, select the image processing algorithms from a plurality of candidate algorithms according to the selection instruction.

The selection instruction refers to an instruction for selecting an image processing algorithm, and the specific form of the selection instruction is not limited. Exemplarily, the selection instruction may include identity information of the image processing algorithm, such as an algorithm name or an algorithm number. Alternatively, a plurality of algorithm combinations may be preset, including any number of candidate algorithms, and the selection instruction includes combination information of a certain algorithm combination.

At S103, determine a target image from the at least two types of to-be-outputted images.

The target image refers to the main image of the output image. The output image refers to an image with several picture-in-picture images. The target image is the main body of the output image. The output image can be obtained by superimposing the picture-in-picture image on the target image.

The number of the to-be-outputted images is at least two, so it can be understood that, as required, two candidate to-be-outputted images for the target image may exist. This embodiment does not limit the selection manner of the target image. For example, the selection manner of the target image may be preset or temporarily designated. Exemplarily, the priorities among the various image processing algorithms may be preset, and according to the selected image processing algorithm, the to-be-outputted image generated by the image processing algorithm with the highest priority is determined as the target image, and other to-be-outputted images are determined to be non-target images. Alternatively, when an image processing algorithm is selected, an externally input target specifying instruction is obtained, and the to-be-outputted image generated by the image processing algorithm corresponding to the target specifying instruction is determined as the target image. The image processing algorithm that generates the target image is the target image processing algorithm.

At S104, generate a picture-in-picture image by using a non-target image of the at least two types of to-be-outputted images.

The non-target image refers to other images that are not the target image among at least two types of to-be-outputted images. In order to enrich the information in the output image and facilitate the users to search target rapidly with various information, it is necessary to integrate the information of the non-target image and the target image.

Specifically, the picture-in-picture image is generated based on the non-target image, and is used to be superimposed with the target image to complete the integration of image information. The specific generation method of the picture-in-picture image is not limited, and may be set as required. It can be understood that the picture-in-picture image is smaller than the target image to avoid loss of information in the target image, and therefore it is necessary to crop and/or scale the non-target image to obtain the picture-in-picture image smaller than the target image. Exemplarily, the cropping coordinate may be set on the target image, and the cropping coordinate may be the center position of the non-target image, or may be any set position.

At S105, superimpose the picture-in-picture image on the target image to obtain an output image.

Figure 2:
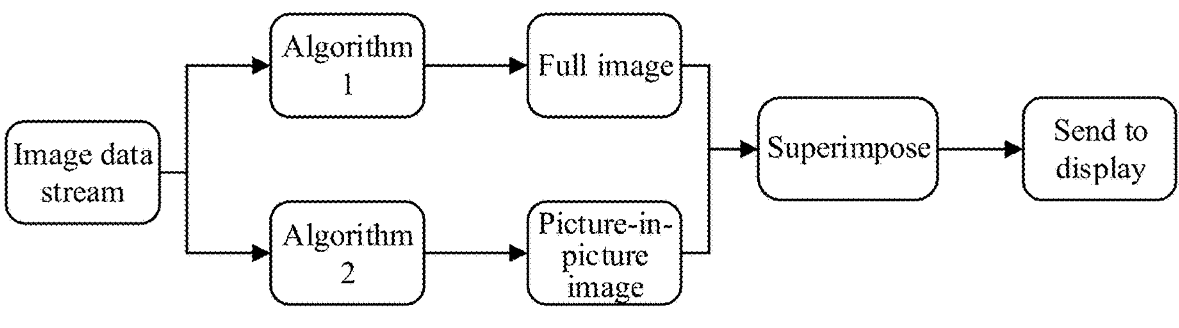
FIG. 2 is a specific flowchart showing a method for picture-in-picture display according to an embodiment of the present disclosure.
Figure 3:
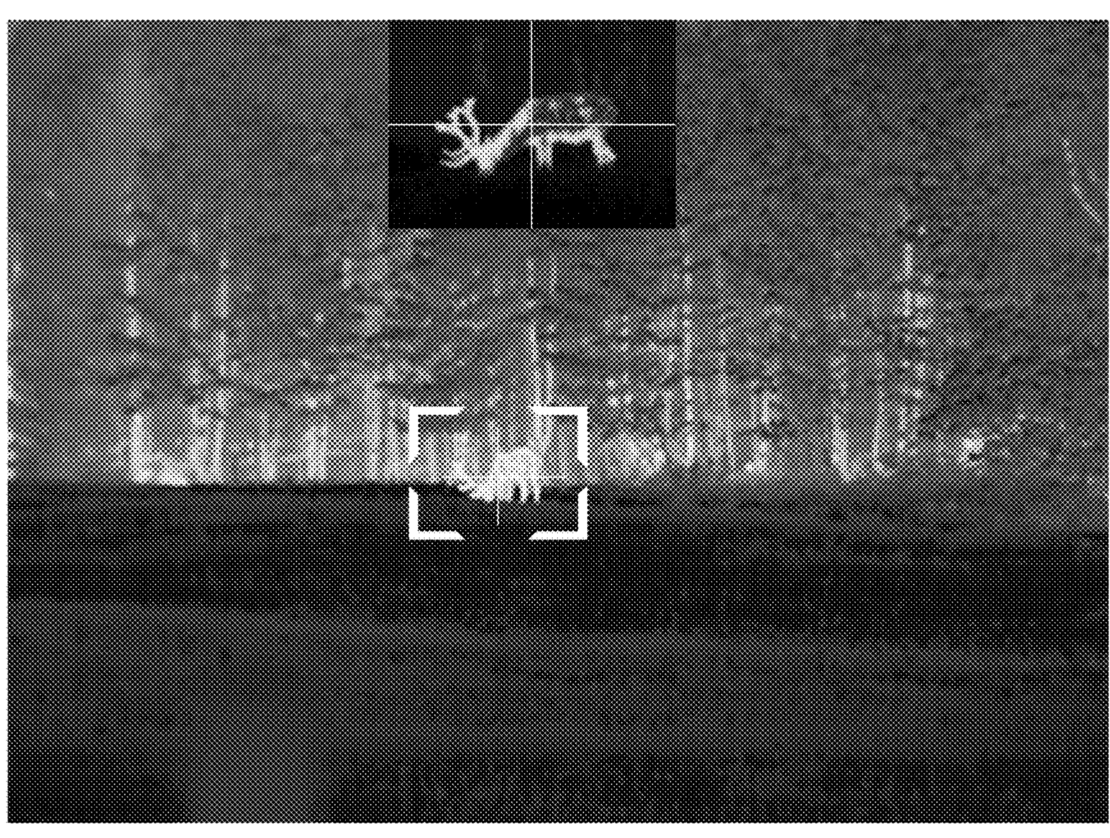
FIG. 3 is a specific output image including a picture-in-picture image according to an embodiment of the present disclosure.

After the picture-in-picture image is obtained, it may be superimposed on the target image to realize the integration of the to-be-outputted image information and to obtain the output image. Further, the output image may be displayed visually, that is, the output image may be sent for display. Reference is made to FIG. 2, which is a specific flowchart showing a method for picture-in-picture display according to an embodiment of the present disclosure. In this embodiment, two image processing algorithms are used. Algorithm 1 is used to generate the target image, and the to-be-outputted image (that is, the non-target image) generated by algorithm 2 is further processed to obtain the picture-in-picture image. The target image and the picture-in-picture image are superimposed for visually display. Exemplarily, the advantage of algorithm 1 may be that details are highlighted, and details in the entire background are clear. But the disadvantage of algorithm 1 is that after highlighting the details, the target is not apparent. Algorithm 2 is applied on the picture-in-picture image. The advantage of algorithm 2 is to weaken the background and highlight the target. The combination of the two algorithms realizes that not only the background is seen clearly, but also the target is quickly highlighted. Reference is made to FIG. 3, which is a specific output image including a picture-in-picture image according to an embodiment of the present disclosure. The small image above the image is the picture-in-picture image.

The specific manner of superimposing is not limited in the present disclosure. It can be understood that, in order to ensure that the picture-in-picture image can be displayed on the output image, the picture-in-picture images cannot overlap with each other. In addition, the picture-in-picture image and the target image may be superimposed as required. Specifically, step S105 may include the following steps.

At step 21, determine a superimposition coordinate of the picture-in-picture image.

At step 22, superimpose the picture-in-picture image on the target image based on the superimposition coordinate to obtain the output image.

In the present disclosure, a corresponding superimposition coordinate is assigned to each of the picture-in-picture images, and the superimposition coordinates corresponding to the picture-in-picture images are different. The output image is obtained by superimposing each of the picture-in-picture images on the target image according to the superimposition coordinates.

In one embodiment, only one picture-in-picture image exists, or the number of picture-in-picture images is more than one, but the positions of the picture-in-picture images in the corresponding non-target images are different. In this case, the process of determining the superimposition coordinate corresponding to the picture-in-picture image may include the following step.

At step 31, determine a coordinate of the picture-in-picture image in the non-target image as the superimposition coordinate.

Figure 4:
FIG. 4 is a specific target image according to an embodiment of the present disclosure.
Figure 5:
FIG. 5 is another specific output image including a picture-in-picture image according to an embodiment of the present disclosure.

That is, in this embodiment, the picture-in-picture image may be used to superimpose the part corresponding to the coordinate in the target image to achieve the effect of replacement. Generally, the to-be-outputted images have the same size in the case that same original image data are processed with different image processing algorithms. Therefore, after the superposition coordinate is determined by the above method, the generated output image has spatial continuity. References are made to FIG. 4 and FIG. 5. FIG. 4 is a specific target image according to an embodiment of the present disclosure. FIG. 5 is a specific output image including a picture-in-picture image according to an embodiment of the present disclosure. FIG. 4 and FIG. 5 correspond to each other. In the output image shown in FIG.

5, the superimposition coordinate of the picture-in-picture image is the corresponding coordinate in the non-target image.

Furthermore, in one embodiment, only a small part of the target image is occupied by the picture-in-picture image, so the target image is the main source of information for the user. In this case, it may be necessary to select a new target image to obtain information from another aspect. In this case, the following steps may further be included.

At step 41, obtain a switching instruction.

At step 42, determine a new target image processing algorithm from the image processing algorithms according to the switching instruction.

The target image processing algorithm is used to generate the target image. The switching instruction refers to an instruction indicating that it is necessary to reselect the target image. According to the switching instruction, a new target image processing algorithm is determined from the previously determined image processing algorithms. Specifically, the switching instruction can specify a new target image processing algorithm. Alternatively, the switching sequence of various image processing algorithms may be preset, and when the switching instruction is obtained, a new target image processing algorithm is determined according to the switching sequence based on the current target image processing algorithm.

The method for picture-in-picture display in the embodiments of the present disclosure is based on the original data stream, that is, after the original image data is obtained, it is processed by at least two different image processing algorithms, each image processing algorithm outputs a type of a to-be-outputted image, and at least two types of to-be-outputted images exist. One of the to-be-outputted images is selected as a basic image, that is, the target image, and other non-target images are used to generate a corresponding picture-in-picture image. Since different image processing algorithms are used to process the same original image data, the obtained target image and the picture-in-picture image can characterize the original image data from different aspects. The output image is obtained by superimposing the picture-in-picture image on the target image. The user can obtain more information with the output image than only viewing the target image, which enriches the type of information obtained by the user, and facilitates the identification of the target. In addition, in the present disclosure, only one channel of original image data is used together with a plurality of image processing algorithms to generate the picture-in-picture image, so that it is unnecessary to adopt multiple hardware devices to acquire multiple channels of original signals.

An apparatus for picture-in-picture display according to the embodiment of the present disclosure is introduced below, and the apparatus for picture-in-picture display described below and the method for picture-in-picture display described above may be referred to each other in correspondence.

Figure 6:
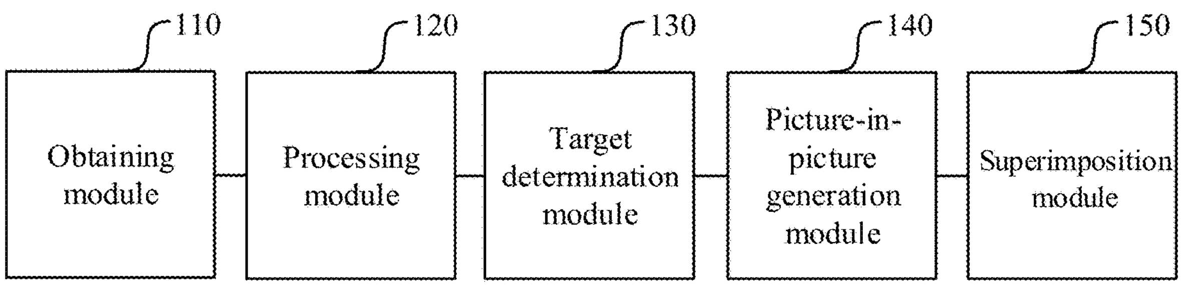
FIG. 6 is a schematic structural diagram showing an apparatus for picture-in-picture display according to an embodiment of the present disclosure.

Reference is made to FIG. 6, which is a schematic structural diagram showing an apparatus for picture-in-picture display according to an embodiment of the present disclosure. The apparatus includes:

- an obtaining module 110 configured to obtain original image data;
- a processing module 120 configured to process the original image data by using at least two image processing algorithms, respectively, to obtain at least two types of to-be-outputted images correspondingly;
- a target determination module 130 configured to determine a target image from the at least two types of to-be-outputted images;
- a picture-in-picture generation module 140 configured to generate a picture-in-picture image by using a non-target image of the at least two types of to-be-outputted images; and
- a superimposition module 150 configured to superimpose the picture-in-picture image on the target image to obtain an output image.

Optionally, the picture-in-picture generation module 140 includes:

- a cropping and scaling unit configured to crop and/or scale the non-target image to obtain the picture-in-picture image.

Optionally, the superimposition module 150 includes:

- a coordinate determination unit configured to determine a corresponding superimposition coordinate of the picture-in-picture image; and
- a superimposition unit configured to superimpose the picture-in-picture image on the target image based on the superimposition coordinate to obtain the output image.

Optionally, the coordinate determination unit includes:

- a corresponding coordinate determination subunit configured to determine a coordinate of the picture-in-picture image in the non-target image as the superimposition coordinate.

Optionally, the apparatus further includes:

- a display module configured to visually display the output image after superimposing the picture-in-picture image and the target image to obtain the output image.

Optionally, the apparatus further includes:

- a first obtaining module configured to obtain a selection instruction before processing the original image data by using at least two image processing algorithms, respectively; and
- an algorithm selection module configured to select the image processing algorithms from a plurality of candidate algorithms according to the selection instruction.

Optionally, the apparatus further includes:

- a second obtaining module configured to obtain a switching instruction after determining a target image from the at least two types of to-be-outputted images; and
- a target switching module configured to determine a new target image processing algorithm from the image processing algorithms according to the switching instruction, where the target image processing algorithm is used to generate the target image.

The electronic device according to the embodiment of the present disclosure is introduced below, and the electronic device described below and the method for picture-in-picture display described above may be referred to each other in correspondence.

Figure 7:
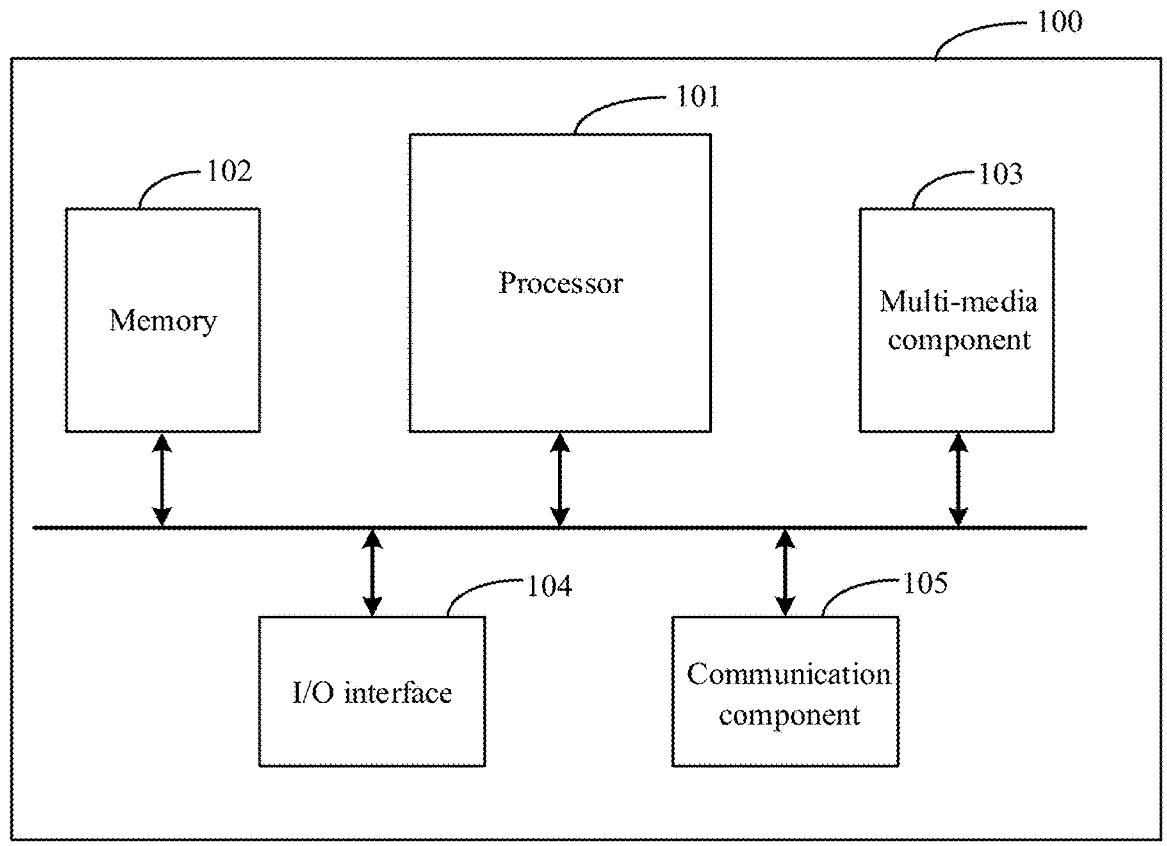
FIG. 7 is a schematic structural diagram showing an electronic device according to an embodiment of the present disclosure.

Reference is made to FIG. 7, which is a schematic structural diagram showing an electronic device according to an embodiment of the present disclosure. The electronic device 100 may include a processor 101 and a memory 102, and may further include one or more of a multi-media component 103, an information input/information output (I/O) interface 104 and a communication component 105.

The processor 101 is used to control the operation of the electronic device 100, so as to complete all or part of the steps in the above-mentioned method for picture-in-picture display. The memory 102 is used to store various types of data to support the operation of the electronic device 100. These data may include, for example, instructions for any application or method operating on the electronic device 100, as well as application-related data. The memory 102 may be implemented by any type of volatile or non-volatile memory device or their combination, such as one or more of a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or an optical disk.

The multi-media component 103 may include a screen and an audio component. The screen may be, for example, a touch screen, and the audio component is used for outputting and/or inputting an audio signal. For example, the audio component may include a microphone for receiving an external audio signal. The received audio signal may be further stored in the memory 102 or sent via the communication component 105. The audio component further includes at least one speaker for outputting an audio signal. The I/O interface 104 provides an interface between the processor 101 and other interface modules, which may be a keyboard, a mouse, a button, and the like. The button may be a virtual button or a physical button. The communication component 105 is used for wired or wireless communication between the electronic device 100 and other devices. The wireless communication may be, for example, one or a combination of Wi-Fi, Bluetooth, Near Field Communication (NFC), 2G, 3G or 4G. So the corresponding communication component 105 may include a Wi-Fi part, a Bluetooth part and an NFC part.

The electronic device 100 may be implemented by one or more of an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor or other electronic components for implementing the above method for picture-in-picture display in the embodiments.

The computer-readable storage medium according to the embodiment of the present disclosure is introduced below, and the computer-readable storage medium described below and the method for picture-in-picture display described above may be referred to each other in correspondence.

According to the present disclosure, there is further provided a computer-readable storage medium for storing a computer program, where the computer program implements the method for picture-in-picture display mentioned above while executed by a processor.

The computer-readable storage medium may include a U disk, a mobile hard disk, a Read-Only Memory (ROM), a Random Access Memory (RAM), a magnetic disk or an optical disk, etc., which can store a program code.

The above embodiments are described in a progressive manner. Each of the embodiments is mainly focused on describing its differences from other embodiments, and reference may be made among these embodiments with respect to the same or similar parts. Since the devices disclosed in the embodiment corresponds to the method disclosed in the embodiment, the description for the device is simple, and reference may be made to the method in the embodiment for the relevant parts.

Those skilled in the art may further appreciate that the units and algorithm steps of the examples described in conjunction with the embodiments disclosed herein may be implemented by electronic hardware, computer software, or a combination thereof. In order to clearly illustrate inter-replacement between the hardware and software, the components and steps of each example are generally described according to their functions in the above description. Whether these functions are executed by means of hardware or software depends on the specific application and design constraints of the technical solution. Those skilled in the art may implement the described function by using different methods for each particular application, but such implementation should not be considered as beyond the scope of the present disclosure.

The steps of the method or algorithm described in conjunction with the embodiments of the present disclosure may be implemented by hardware, a software module executed by a processor, or a combination thereof. The software module may reside in a Random Access Memory (RAM), an internal memory, a Read Only Memory (ROM), an Electrically Programmable ROM, an Electrically-Erasable Programmable ROM, a register, a hard disk, a removable disk, a CD-ROM, or any other storage medium known in the art.

Finally, it should also be noted that in this specification, relationship terms such as "first" and "second" etc. are only used to distinguish one entity or operation from another entity or operation, and do not necessarily require or imply that there is any such actual relationship or order between these entities or operations. Moreover, the terms "comprises", "includes", or any other variation are intended to cover a non-exclusive inclusion such that a process, method, article, or apparatus comprising a set of elements includes not only those elements but also other elements not expressly listed, and may also include elements inherent to such a process, method, article, or apparatus.

In this specification, specific examples are used to illustrate the principles and implementations of the present disclosure. The above examples are only used to help understand the methods and core ideas of the present disclosure. Meanwhile, those skilled in the art may make changes in specific implementations and application scenarios based on concepts of the present disclosure. In summary, the content of this specification should not be construed as limiting the present disclosure.

The invention claimed is:

1. A method for picture-in-picture display, comprising:

obtaining original image data;

processing the original image data by using at least two image processing algorithms, respectively, to obtain at least two types of to-be-outputted images correspondingly;

determining a target image from the at least two types of to-be-outputted images;

determining at least one image that is not the target image among the at least two types of to-be-outputted images as a non-target image;

generating a picture-in-picture image by using the non-target image of the at least two types of to-be-outputted images; and superimposing the picture-in-picture image on the target image to obtain an output image.

2. The method according to claim 1, wherein the generating of a picture-in-picture image by using a non-target image of the at least two types of to-be-outputted images comprises:

cropping and/or scaling the non-target image to obtain the picture-in-picture image.

3. The method according to claim 1, wherein the superimposing of the picture-in-picture image on the target image to obtain an output image comprises:

determining a superimposition coordinate of the picture-in-picture image; and superimposing the picture-in-picture image on the target image based on the superimposition coordinate to obtain the output image.

4. The method according to claim 3, wherein the determining of a superimposition coordinate of the picture-in-picture image comprises:

determining a coordinate of the picture-in-picture image in the non-target image as the superimposition coordinate.

5. The method according to claim 1, after superimposing the picture-in-picture image on the target image to obtain an output image, further comprising:

displaying the output image visually.

6. The method according to claim 1, before processing the original image data by using at least two image processing algorithms, respectively, further comprising:

obtaining a selection instruction; and selecting the image processing algorithms from a plurality of candidate algorithms according to the selection instruction.

7. The method according to claim 6, after determining a target image from the at least two types of to-be-outputted images, further comprising:

obtaining a switching instruction; and determining a new target image processing algorithm from the image processing algorithms according to the switching instruction, wherein the target image processing algorithm is used to generate the target image.

8. An electronic device comprising a memory and a processor, wherein the memory is configured to store a computer program; and the processor is configured to execute the computer program to implement the method for picture-in-picture display according to claim 1.

9. A non-transitory computer-readable storage medium for storing a computer program, wherein the computer program implements the method for picture-in-picture display according to claim 1 while executed by a processor.

* * * * *